US009053085B2

(12) United States Patent
Dubbels

(10) Patent No.: US 9,053,085 B2
(45) Date of Patent: *Jun. 9, 2015

(54) ELECTRONIC DOCUMENT SOURCE INGESTION FOR NATURAL LANGUAGE PROCESSING SYSTEMS

(71) Applicant: International Business Machines Corporation, Armonk, NY (US)

(72) Inventor: Joel C. Dubbels, Eyota, MN (US)

(73) Assignee: International Business Machines Corporation, Armonk, NY (US)

(*) Notice: Subject to any disclaimer, the term of this patent is extended or adjusted under 35 U.S.C. 154(b) by 130 days.

This patent is subject to a terminal disclaimer.

(21) Appl. No.: 13/709,413

(22) Filed: Dec. 10, 2012

(65) Prior Publication Data

US 2014/0164407 A1    Jun. 12, 2014

(51) Int. Cl.
G06F 17/27    (2006.01)
G06F 17/22    (2006.01)

(52) U.S. Cl.
CPC .......... *G06F 17/2705* (2013.01); *G06F 17/227* (2013.01)

(58) Field of Classification Search
CPC   G06F 17/2705; G06F 17/2264; G06F 17/227
USPC ................................. 707/755, 756
See application file for complete search history.

(56) References Cited

U.S. PATENT DOCUMENTS

| | | | | |
|---|---|---|---|---|
| 5,579,521 A * | 11/1996 | Shearer et al. | ................. | 719/329 |
| 5,907,836 A * | 5/1999 | Sumita et al. | ................. | 707/754 |
| 6,038,573 A * | 3/2000 | Parks | ............................. | 715/202 |
| 6,076,088 A | 6/2000 | Paik et al. | | |
| 6,199,068 B1 * | 3/2001 | Carpenter | ............................. | 1/1 |
| 6,298,389 B1 * | 10/2001 | Gerhardt | ....................... | 719/313 |
| 6,429,882 B1 * | 8/2002 | Abdelnur et al. | ............. | 715/763 |
| 6,596,031 B1 * | 7/2003 | Parks | ............................. | 715/202 |
| 6,654,758 B1 * | 11/2003 | Teague | .................................. | 1/1 |
| 6,718,336 B1 * | 4/2004 | Saffer et al. | ........................... | 1/1 |
| 7,389,474 B2 * | 6/2008 | Rettig et al. | .................. | 715/263 |

(Continued)

FOREIGN PATENT DOCUMENTS

WO    WO 00/48088    *    8/2000

OTHER PUBLICATIONS

International Search Report and Written Opinion of the ISA dated Jun. 13, 2014—International Application No. PCT/IB2014/058910.

*Primary Examiner* — Phuong Thao Cao
(74) *Attorney, Agent, or Firm* — Patterson & Sheridan, LLP

(57) ABSTRACT

The data store for a natural-language computing system may include information that originates from a plurality of different data sources—e.g., journals, websites, magazines, reference books, and the like. In one embodiment, the information or text from the data sources are converted into a single, shared format and stored as objects in a data store. In order to ingest the different documents with their respective formats, a natural language processing system may perform preprocessing to change the different formats into a normalized format. When a new text document is received, the text may be correlated to a particular properties file which includes instructions specifying how the preprocessor should interpret the received text. Based on these instructions, a preprocessor identifies relevant portions of the text document and assigns these portions to formatting elements in the normalized format. The text may then be stored in the objects based on this assignment.

13 Claims, 5 Drawing Sheets

(56) References Cited

U.S. PATENT DOCUMENTS

| | | | |
|---|---|---|---|
| 7,464,330 B2* | 12/2008 | Bishop et al. | 715/235 |
| 7,546,313 B1* | 6/2009 | Sonderegger | 1/1 |
| 7,734,636 B2* | 6/2010 | Handley | 707/755 |
| 7,778,982 B2* | 8/2010 | Baker | 707/694 |
| 7,797,303 B2 | 9/2010 | Roulland et al. | |
| 7,840,605 B2* | 11/2010 | Ruan et al. | 707/802 |
| 7,882,055 B2 | 2/2011 | Estes | |
| 7,917,548 B2* | 3/2011 | Gibson et al. | 707/805 |
| 8,180,758 B1 | 5/2012 | Cornali | |
| 8,527,468 B1* | 9/2013 | Crafford et al. | 707/662 |
| 2002/0004806 A1* | 1/2002 | Myers et al. | 707/523 |
| 2002/0166002 A1* | 11/2002 | Milner et al. | 710/8 |
| 2003/0028563 A1* | 2/2003 | Stutz et al. | 707/513 |
| 2003/0037302 A1* | 2/2003 | Dzienis | 715/523 |
| 2003/0135633 A1* | 7/2003 | Dror et al. | 709/231 |
| 2003/0212688 A1* | 11/2003 | Smith | 707/100 |
| 2003/0220747 A1* | 11/2003 | Vailaya et al. | 702/19 |
| 2003/0225722 A1* | 12/2003 | Brown et al. | 707/1 |
| 2004/0004636 A1* | 1/2004 | van Driel | 345/760 |
| 2004/0064487 A1* | 4/2004 | Nguyen et al. | 707/204 |
| 2004/0103367 A1* | 5/2004 | Riss et al. | 715/506 |
| 2004/0163048 A1* | 8/2004 | McKnight et al. | 715/517 |
| 2004/0177062 A1* | 9/2004 | Urquhart et al. | 707/3 |
| 2005/0091587 A1* | 4/2005 | Ramarao et al. | 715/522 |
| 2005/0091589 A1* | 4/2005 | Ramarao | 715/522 |
| 2005/0097455 A1* | 5/2005 | Zhou et al. | 715/513 |
| 2005/0108267 A1* | 5/2005 | Gibson et al. | 707/101 |
| 2005/0149861 A1* | 7/2005 | Bishop et al. | 715/515 |
| 2005/0165760 A1* | 7/2005 | Seo | 707/3 |
| 2006/0155725 A1* | 7/2006 | Foster et al. | 707/100 |
| 2006/0212879 A1* | 9/2006 | Bennetto et al. | 719/328 |
| 2006/0294396 A1* | 12/2006 | Witman et al. | 713/189 |
| 2007/0094282 A1* | 4/2007 | Bent | 707/100 |
| 2007/0294100 A1* | 12/2007 | Chen et al. | 705/1 |
| 2008/0013916 A1* | 1/2008 | Sharpe et al. | 386/52 |
| 2008/0021860 A1 | 1/2008 | Wiegering et al. | |
| 2008/0140388 A1* | 6/2008 | Niimura | 704/9 |
| 2008/0215392 A1* | 9/2008 | Rajan | 705/7 |
| 2008/0263333 A1* | 10/2008 | Wang et al. | 712/220 |
| 2008/0270463 A1* | 10/2008 | Wang et al. | 707/103 R |
| 2008/0281944 A1* | 11/2008 | Vorne et al. | 709/218 |
| 2008/0319649 A1* | 12/2008 | Nath | 701/205 |
| 2009/0083305 A1* | 3/2009 | Baker | 707/102 |
| 2009/0089126 A1* | 4/2009 | Odubiyi | 705/7 |
| 2009/0094205 A1* | 4/2009 | Malone et al. | 707/3 |
| 2009/0171957 A1* | 7/2009 | Havewala et al. | 707/6 |
| 2009/0249076 A1* | 10/2009 | Reed et al. | 713/181 |
| 2009/0259670 A1* | 10/2009 | Inmon | 707/100 |
| 2010/0045567 A1* | 2/2010 | Lin | 345/1.1 |
| 2010/0070448 A1* | 3/2010 | Omoigui | 706/47 |
| 2010/0228721 A1* | 9/2010 | Mok et al. | 707/711 |
| 2010/0250236 A1* | 9/2010 | Jagannathan et al. | 704/9 |
| 2010/0306285 A1* | 12/2010 | Shah et al. | 707/803 |
| 2010/0306796 A1* | 12/2010 | McDonald et al. | 725/32 |
| 2011/0004465 A1 | 1/2011 | Rose et al. | |
| 2011/0060749 A1* | 3/2011 | Petakov et al. | 707/755 |
| 2011/0066645 A1* | 3/2011 | Cooper et al. | 707/770 |
| 2011/0131209 A1* | 6/2011 | Bechtel et al. | 707/737 |
| 2011/0131212 A1* | 6/2011 | Shikha | 707/741 |
| 2011/0153647 A1* | 6/2011 | Hoellwarth | 707/769 |
| 2011/0238566 A1* | 9/2011 | Santos | 705/38 |
| 2011/0296321 A1* | 12/2011 | Lord | 715/760 |
| 2012/0109752 A1* | 5/2012 | Strutton et al. | 705/14.58 |
| 2012/0124029 A1* | 5/2012 | Kant | 707/715 |
| 2012/0137205 A1* | 5/2012 | Pandrangi et al. | 715/223 |
| 2012/0150884 A1* | 6/2012 | Faenger | 707/756 |
| 2012/0159306 A1* | 6/2012 | Sharma et al. | 715/234 |
| 2012/0215535 A1* | 8/2012 | Wasserblat et al. | 704/243 |
| 2012/0215782 A1* | 8/2012 | Jagannathan et al. | 707/740 |
| 2012/0265759 A1* | 10/2012 | Bergeron et al. | 707/740 |
| 2012/0303699 A1 | 11/2012 | Luu et al. | |
| 2012/0311426 A1* | 12/2012 | Desai et al. | 715/227 |
| 2013/0185050 A1* | 7/2013 | Bird et al. | 704/2 |
| 2013/0268832 A1* | 10/2013 | Vemireddy | 715/206 |
| 2013/0290266 A1* | 10/2013 | Kapoor | 707/661 |
| 2013/0290270 A1* | 10/2013 | Pareek | 707/687 |
| 2014/0074845 A1* | 3/2014 | Dimassimo et al. | 707/739 |
| 2014/0115508 A1* | 4/2014 | MacLean et al. | 715/764 |

\* cited by examiner

PROPERTIES FILE                                    210

```
# ==========================================
# subject category for this implementation
# ==========================================
subjectcategory = Colon Cancer Research
# ==========================================
# extension class used for processing
# ==========================================
processingclass = com.ibm.deepxx.data_ingestion.preprocessor.ColonCancer
# ==========================================
# flag to indicate whether all text sections should
# be included in the generated CAS (set to true when
# generating CASes for passage search, for example)
# ==========================================
alltextmode = false
# ==========================================
# headers to search for
# ==========================================
header.002=<strong>[ ]*discussion/general[ ]+discussion[ ]*</strong>
header.004=<td[^>]*>[ ]*discussion/general[ ]+discussion[ ]*</td>
header.006=<strong>[ ]*rationale[ ]*</strong>
header.008=<strong>[ ]*commentary[ ]*</strong>
header.010=<strong>[ ]*index[ ]*</strong>
contextforheader.002=ctxdiscussion
contextforheader.004=ctxdiscussion
contextforheader.006=contextgeneric
contextforheader.008=contexttext
contextforheader.010=contextignore
# ==========================================
# definition of actual contexts that we want included in
# the resulting ingestion CASes
# ==========================================
context.ctxdiscussion=discussion
contextgeneric=generic
contextignore=ignore
contexttext=text only
```

- 305 : subject category block
- 310 : processing class block
- 315 : alltextmode block
- 320 : headers block
- 325 : contexts block

FIG. 3

ELECTRONIC DOCUMENT SOURCE INGESTION FOR NATURAL LANGUAGE PROCESSING SYSTEMS

BACKGROUND

The present invention relates to creating a data store compatible with natural language processing, and more specifically, to converting portions of text from a plurality of different data sources into objects with a shared format.

Natural language processing (NLP) is a field of computer science, artificial intelligence, and linguistics concerned with the interactions between computers and human languages. To interact with humans, natural-language computing systems may use a data store that is parsed and annotated. For example, the computing system may use the data store to identify an answer to a question posed by a human user by correlating the question to the annotations in the data store.

Before the NLP computing system is able to interact with a user, the data store is populated with different text documents. In addition, annotators may parse the text in the data store to generate metadata about the text. Using the metadata and the stored text, the NLP computing system can interact with the user to, for example, answer a posed question, diagnose an illness based on provided symptoms, evaluate financial investments, and the like. In a sense, the data store acts like the "brain" of the natural-language computing system.

SUMMARY

Embodiments of the present invention include a system and a computer program product that receive a plurality of electronic documents, wherein the electronic documents are arranged according to different, respective formats. The system and computer program product identify a properties file associated with one of the electronic documents where the properties file defines a formatting element of the respective format in the one electronic document and an action corresponding to a text portion associated with the formatting element. The system and computer program product parse the one electronic document to identify the formatting element. Upon identifying the text portion associated with the identified formatting element, the system and computer program product performs the action to the text portion by assigning the text portion to a formatting element of a normalized format. The system and computer program product store the text portion into a natural language processing (NLP) object based on the formatting element of the normalized format, wherein text in the NLP object is arranged based on the normalized format.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 3 is an example properties file for preprocessing a received text document, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
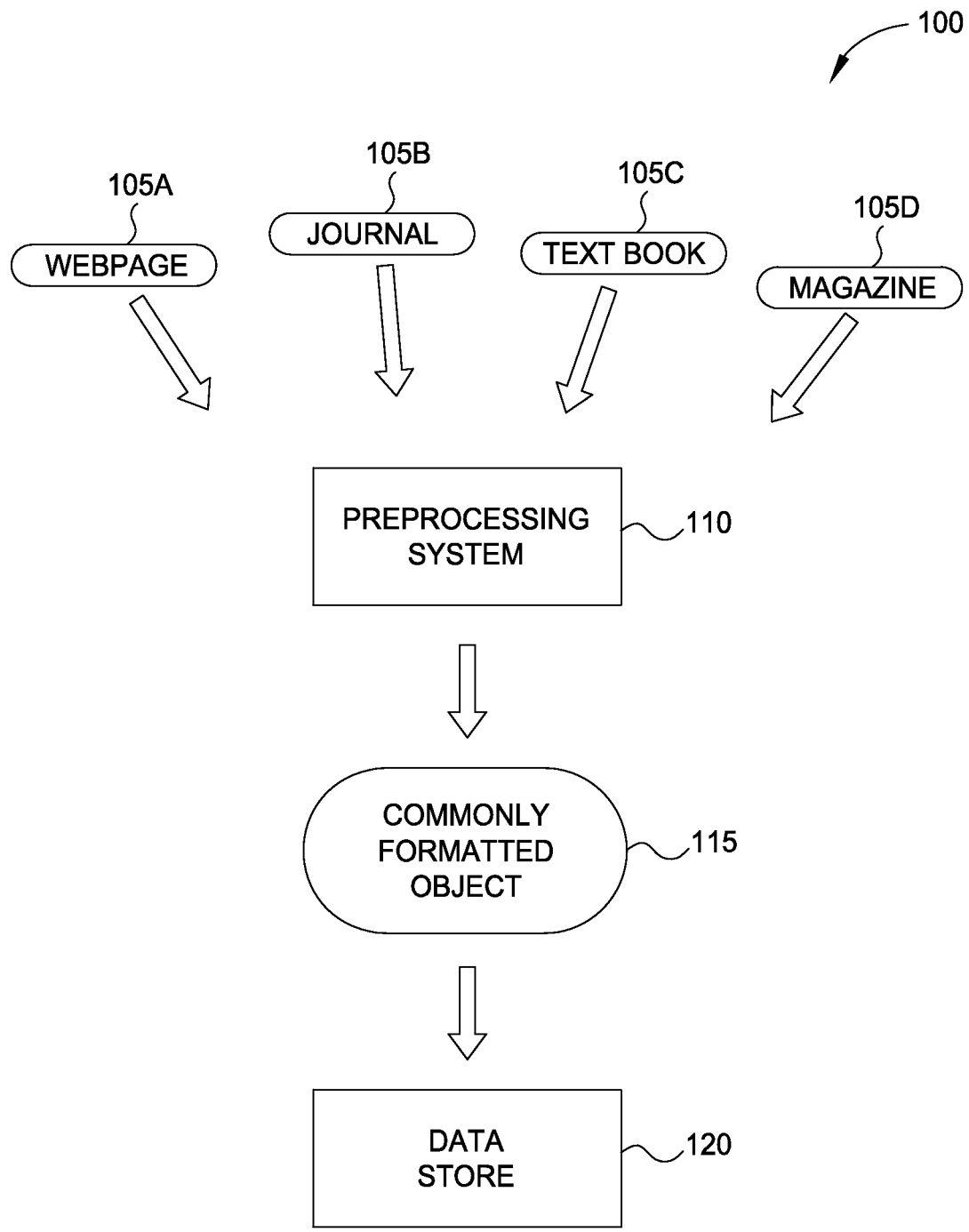
FIG. 1 is a flow chart for generating a data store for a natural language processing system, according to one embodiment described herein.

A data store for a NLP computing system may include information that originates from a plurality of different data sources—e.g., journals, websites, magazines, reference books, textbooks, and the like. In one embodiment, the information or text from the data sources are converted into a single, shared format and stored as objects in a data store. For example, an article in a journal may be formatted differently than an entry in an encyclopedia. Moreover, different journals may have different formats for printing their respective articles. Thus, in order to ingest the different documents with their respective formats, a NLP system may perform preprocessing to change the different formats into a normalized format (also referred to herein as a "common format"). As used herein, a data source's format includes the manner in which the text is arranged. The format may include different formatting elements such as section headers, paragraph headers, elements in a mark-up language (e.g., HTML and XML tags), and the like. Additionally, the format used by a data source may specify a particular hierarchy or order of the formatting elements—e.g., an introduction section followed by a general discussion section followed by a conclusion section.

When using text mined from the data sources to generate the objects, a preprocessing system may use a properties file and individual extension classes to convert the text from the original format to the normalized format shared by all the objects in the data store. Specifically, when a new text document is received from a data source, the text may be correlated to a particular properties file which includes instructions specifying how a preprocessor should interpret the received text. For example, the properties file may indicate the particular extension class that should be used or which portions of the text are relevant and which can be ignored. In one embodiment, the properties file identifies a particular formatting element in the original format (e.g., a specific header or tag) as well as an action the preprocessor should perform with the text associated with that element. For example, the properties file may instruct the preprocessor to ignore the text in the document's reference section of the document but store the text in the document's discussion section. The preprocessor parses the text until it discovers the specified headers and performs the associated action. In this manner, the preprocessor uses the formatting elements in the original format as indicators to associate the text with a formatting element in the commonly shared format. Each time a program administrator wishes to ingest text with a different format into the data store, the administrator may generate a new properties file and a corresponding extension class for configuring the preprocessor to parse the text.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the data store) or related data available in the cloud. For example, the preprocessor that populates the data store could execute on a computing system in the cloud and receive the particular text documents. In such a case, the use could transmit the text documents to the preprocessor which then generates the data store at storage location in the cloud. Doing so allows a user to access this information from any computing system attached to a network connected to the cloud (e.g., the Internet).

FIG. 1 is a flow chart 100 for generating a data store for a NLP system, according to one embodiment described herein. The flow chart receives text documents (e.g., electronic files, portable document format (PDF) files, flat text files, HTML text, and the like) from a plurality of different data sources 105A-105D which may arrange the text according to respective formats. For example, the webpage 105A may represent different web pages that are retrieved from a particular domain, e.g., Wikipedia® (a registered trademark of the Wikimedia Foundation). The domain may include multiple webpages that are each directed to a specific topic. Although not shown in FIG. 1, a webcrawler may discover each webpage 105A and transmit these pages to the preprocessor system 110 as respective text documents. The domain associated with the webpage 105A may define a particular format that is shared by all the webpages 105A of that domain. For example, the webpage 105A may include title tags (<title>TITLE</title>) followed by body tags (<body>), header tags (<h1> . . . <hN>), and the like. Moreover, the defined format may include predefined values for these tags. For example, the last two headers in the webpage 105A may always be a "references" and "external links". Moreover, the first header may always be the subject or title of the webpage 105A. Thus, the data sources 105 may have a predictable format that may be used to parse and identify the relevant text.

The other data sources shown in FIG. 1 may have formats that arrange text differently relative to the webpages 105A. For example, the journal 105B may always use the same format when publishing articles. The format may include, for example, the same primary headers or formatting elements—e.g., introduction, analysis, conclusion, and references—arranged in a particular order. Accordingly, each article in the journal 105B will at least have these headers even if these headers are further divided by sub-sections that are customizable by the authors. The primary headers may be defined using a mark-up language (e.g., HTML or XML) like the webpage 105A if the journal is published electronically, or the headers may be part of a flat text document (e.g., a PDF document) that lacks any kind of mark-up metadata. In the latter example, the journal's format may specify a particular spacing or font for the formatting elements. For example, the format may require that the primary headers are 14-point font and indented while any subsection headers are 12-point font and underlined. A parser could then scan the text document and identify each of the primary headers (e.g., the introduction header, conclusion header, etc.) based on the spacing or font characteristics of the words. After identifying the primary headers, the parser may associate the text of the document to the appropriate header—e.g., the text between the introduction header and the analysis header is identified as the text of the introduction section of the article 105B. A similar process may be performed on text documents (e.g., articles, pages, sub-pages, or topics) received from the other data sources. For example, a plurality of electronic pages from an encyclopedia may be transmitted to the preprocessing system 110 which uses a parser to a scan the pages to identify different topics and the text associated with those topics. For example, the encyclopedia may use a special font or spacing when introducing a new topic. Using these known characteristics of the format, the preprocessing system 110 may identify portions of the page that correspond to each topic.

The preprocessing system 110 receives the various text documents and uses the respective formats to identify relevant text. Specifically, the preprocessing system 110 may include respective code portions referred to herein as extension classes that correspond to each of the formats. Using the extension class, the preprocessing system 110 identifies the relevant text and associates the text with a formatting element in a normalized (or common) format. For example, the preprocessing system 110 may associate the text under the introduction header in a journal article to the overview header in the normalized format. Similarly, the system 110 may also associate the text under the synopsis header in a magazine article to the overview header in the normalized format. In one embodiment, the preprocessing system 110 associates related data that may be labeled differently in the respective formats of the data sources 105 with the same header in the normalized format. Based on this association, the preprocessing system 110 generates objects 115 (e.g., NLP objects) that are commonly formatted. That is, regardless of the particular format used to arrange the received text, in the NLP object 115, the text is arranged based on a shared format between all the objects 115. For example, the preprocessing system 110 may generate a new object 115 for each topic received from a data source (e.g., an article about breast cancer or a webpage about treating prostate cancer). If, however, there is already an object 115 assigned to that topic, the preprocessing system may store the new text into the already existing object 115. The preprocessing system 110 arranges the text in these documents into the normalized format where each document is categorized in the object 115. In one embodiment, the object 115 may be an individual source common analysis system (CAS) data structure as defined by the Unstructured Information Management Architecture (UIMA), an OASIS standard. Once the text documents are ingested (i.e., the text is arranged into the objects 115), the preprocessing system 110 may place the object 115 or CAS into the data store 120.

Figure 2:
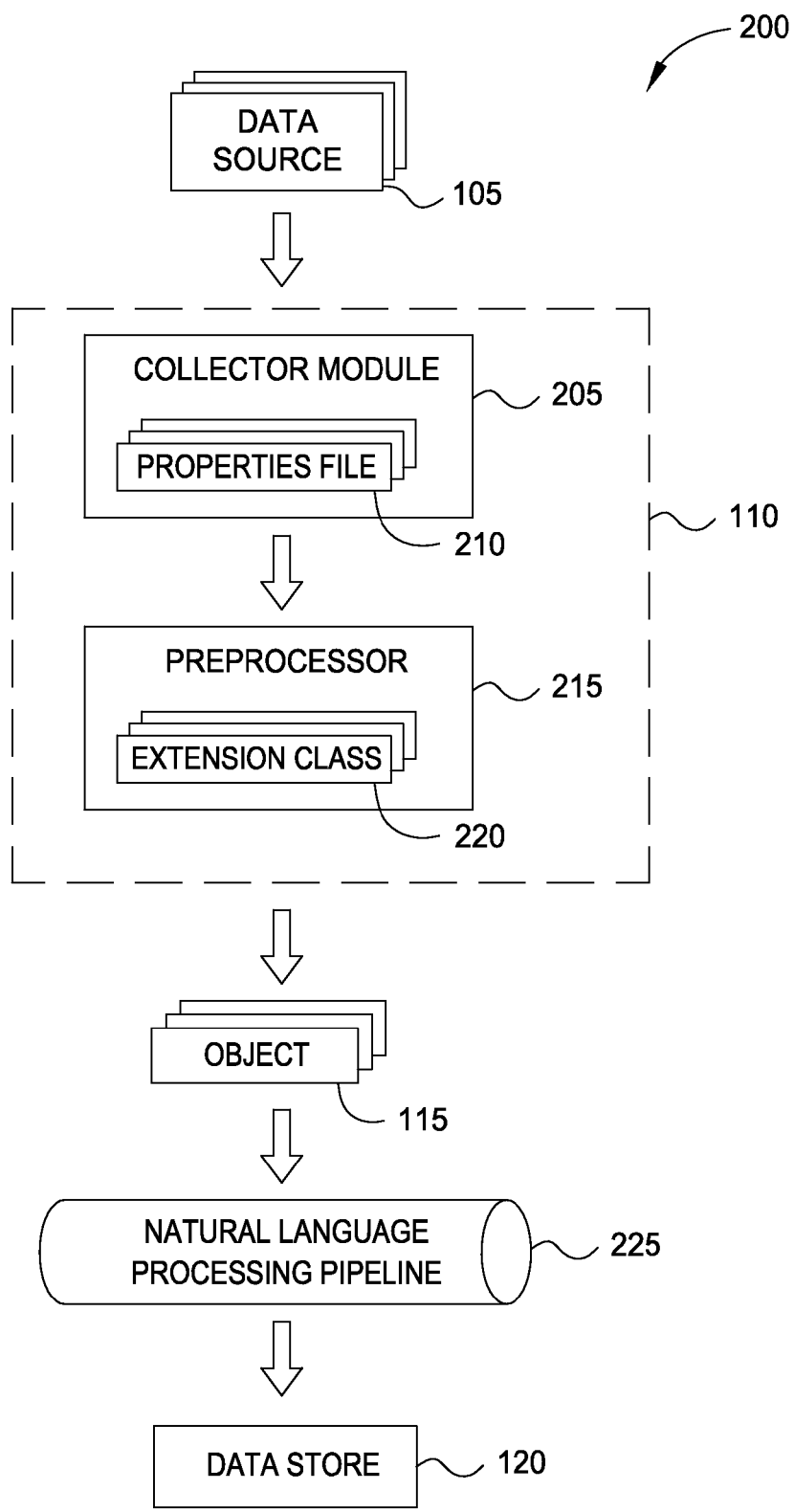
FIG. 2 is a flow chart for translating text documents arranged according to multiple formats into commonly formatted objects in the data store, according to one embodiment described herein.

FIG. 2 is a flow chart 200 for translating text documents in multiple formats into commonly formatted objects in the data store, according to one embodiment described herein. The flow chart 200 begins when a data source 105 transmits a document containing text to a collector module 205 of the preprocessing system 110. The collector module 205 uses predefined criteria to match the received text document to a particular properties file 210. As stated previously, the formatting of the text document may differ based on the data source 105 (e.g., magazine, encyclopedia, Internet domain, etc.) associated with the document. To handle the different formats, the collector module 205 may include a properties file 210 that corresponds to one of the different formats used by the data sources 105. To match a received text document with the appropriate properties file 210, the collector module 205 may compare a characteristic of the text document to criteria listed in, for example, a look-up table. Example characteristics used to identify a properties file 210 include the data source 105 associated with the document, a port the document was received on, an IP address associated with the document, the filename of the text document, and the like. The criteria used for matching may stipulate which properties file 210 to use based on these characteristics—e.g., text documents received on port 40 correspond to Properties File 1 while text documents received on port 60 correspond to Properties File 5. Once the properties file 210 is identified, the preprocessing system 110 uses the file 210 as a map for generating the object 115.

FIG. 3 is an example properties file 210 for preprocessing a received text document, according to one embodiment described herein. In one embodiment, a programmer may generate a properties file 210 for each data source format. Generally, the properties file 210 contains instructions for parsing and categorizing the text received from a particular data source. The example properties file 210 shown in FIG. 3 includes a portion 305 that provides the subject for the received text. For example, the text may have been received from a magazine that deals only with colon cancer research. For a data source received from a data source (e.g., an encyclopedia) that may include articles about a variety of topics or subjects, this portion of the properties file 210 may be omitted. Instead, the subject of the article may be determined later when the text is actually parsed by the preprocessor.

The properties file 210 also includes a portion 310 for selecting the particular extension class used to process (i.e., parse and categorize) the text document. As mentioned previously, the processing system may include a plurality of extension classes that correspond to a particular format of a data source. That is, because the formatting is different, the extension classes enable the preprocessing system to parse the different textual arrangements. As shown here, the file 210 calls an extension class labeled "ColonCancer" for processing the corresponding text document.

Portion 320 of the properties file 210 illustrate a list of formatting elements that the preprocessing system should search for when parsing the text document. Here, the formatting elements are headers that include both HTML tags and corresponding labels. For header.002, the properties file 210 instructs the parser to look for the "<strong>" and "</strong>" HTML tags that encapsulate the regular expression strings "discussion/general" or "discussion". Moreover, the entries may contain other operators (e.g., [ ],*, and +) that define how the preprocessor searches for the strings. The operators may be used to, for example, remove extra spaces, serve as wildcards, perform logical comparisons, and the like. Using the combination of formatting elements and operators, portion 320 provides instructions to the preprocessor to parse the text document and identify a header in the document that matches a specified header in the properties file 210. Although the particular properties file 210 shown in FIG. 3 uses a combination of HTML tags and a regular expression, in other embodiments, portion 320 may use only mark-up language or only a regular expression string to identify relevant text. For example, portion 320 may include an entry that looks only for the tags "<title>" and "</title>" to identify the subject matter of document. Additionally, the entries in portion 320 may include spacing, font type, font size, font characteristics, and the like as criteria for identifying relevant text. For example, an entry may look for a header that is indented by a certain space and is bolded.

The properties file 210 also includes other entries for identifying different formatting elements in the text documents—e.g., header.004, header.006, header.008, and header.010. For example, the received text document may be an article for a particular health journal which always includes a discussion/general, rationale, commentary, and index sections in its articles. Moreover, the properties file 210 may be configured to include different implementations of the data source's format. For example, assume the discussion/general section of the data source may be nested either within "<strong>" HTML tags or "<td>" HTML tags. In response, the user may configure the properties file to look for the string "discussion/general" or "discussion" regardless of the particular way the text document implements the format. In this manner, the properties file 210 uses portion 320 to instruct the preprocessor to find these predetermined sections.

In addition to providing the necessary information for identifying particular formatting elements in a text document, the portion 320 also defines an action to be performed with the text associated with the respective formatting element. Specifically, the action shown here is assigning the text portions associated with the headers to a particular context. In FIG. 3, the text portions associated with header.002 and header.004 are assigned to the "discussion context". The text portion associated with header.006 is assigned to the "generic context". The text portion associated with header.008, however, is assigned to the "text context". Thus, the discussion section (i.e., the discussion context), the rationale section (i.e., the generic context) and the commentary section (i.e., the text context) are stored as different contexts within the object. Moreover, portion 320 stipulates that the preprocessor should ignore the portion of the text document associated with header.010. Although properties file 210 shows that the different text portions are assigned to separate contexts, in other embodiments, the NPL preprocessor may group different text portions into the same context—e.g., the discussion section and the rational section of the received document may both be assigned to the discussion context.

Portion 325 of the properties file 210 provides the new formatting elements associated with the different contexts assigned in portion 320. For example, the textual sections of the received document that are assigned to the discussion context are labeled as "discussion" in the object while the generic context is labeled as "generic" in the object file. The ignored text may be omitted from the object (i.e., not parsed by the preprocessing system) or, alternatively, be placed in a portion of the object with a label that indicates to any downstream processing module that the text should be ignored. The text context is labeled as "text only". The sections of the received document assigned with this label may be either included in the generated object or excluded based on a particular setting in the properties files 210. In this manner, the properties file 210 dictates how the text in a received document is arranged according to formatting elements in the common format.

Portion 315 of the properties file 210 includes a flag (all-textmode) for indicating whether all text sections in a text document should be included in the generated object. If the flag is set to false, this instructs the preprocessing system to divide the text document into different contexts as discussed previously. If the flag is true, however, the resulting generated object contains text for all defined contexts shown in portion 320 plus those sections defined as belonging to context defined as "text only" by portion 325. In contrast, if the flag was false, the preprocessing system may ignore these textual portions (i.e., the portions labeled 'text only'). Stated differently, the flag is a setting in the file 210 that enables or disables a passage search where all the text in the received document (besides the text associated with a header that portion 320 specifically says should be ignored) is included in the generated object. Thus, the portion 315 may be used to instruct the preprocessing system how to parse the text document and whether to include optional text such as the text labeled as "text only".

In one embodiment, the properties file 210 includes a location of a statistics file that is updated when the preprocessing system parses and characterizes the received text document. The preprocessing system may update the statistic files based on, for example, whether the preprocessor found the formatting elements identified in portion 320 or the size of the received text document. Moreover, the file 210 may include the location of a trace file that may be updated as the text document moves through the preprocessing system and any downstream processing.

Returning to FIG. 2, the collector module 205 transmits the text document and the identified properties file 210 to the preprocessor 215. In one embodiment, the extension class specified in the properties file 210 determines the extension class 220 used by the preprocessor 215. Stated differently, the properties file 210 identifies the type of preprocessor 215 used by the preprocessor system 110 to parse and characterize the text document.

Figure 4:
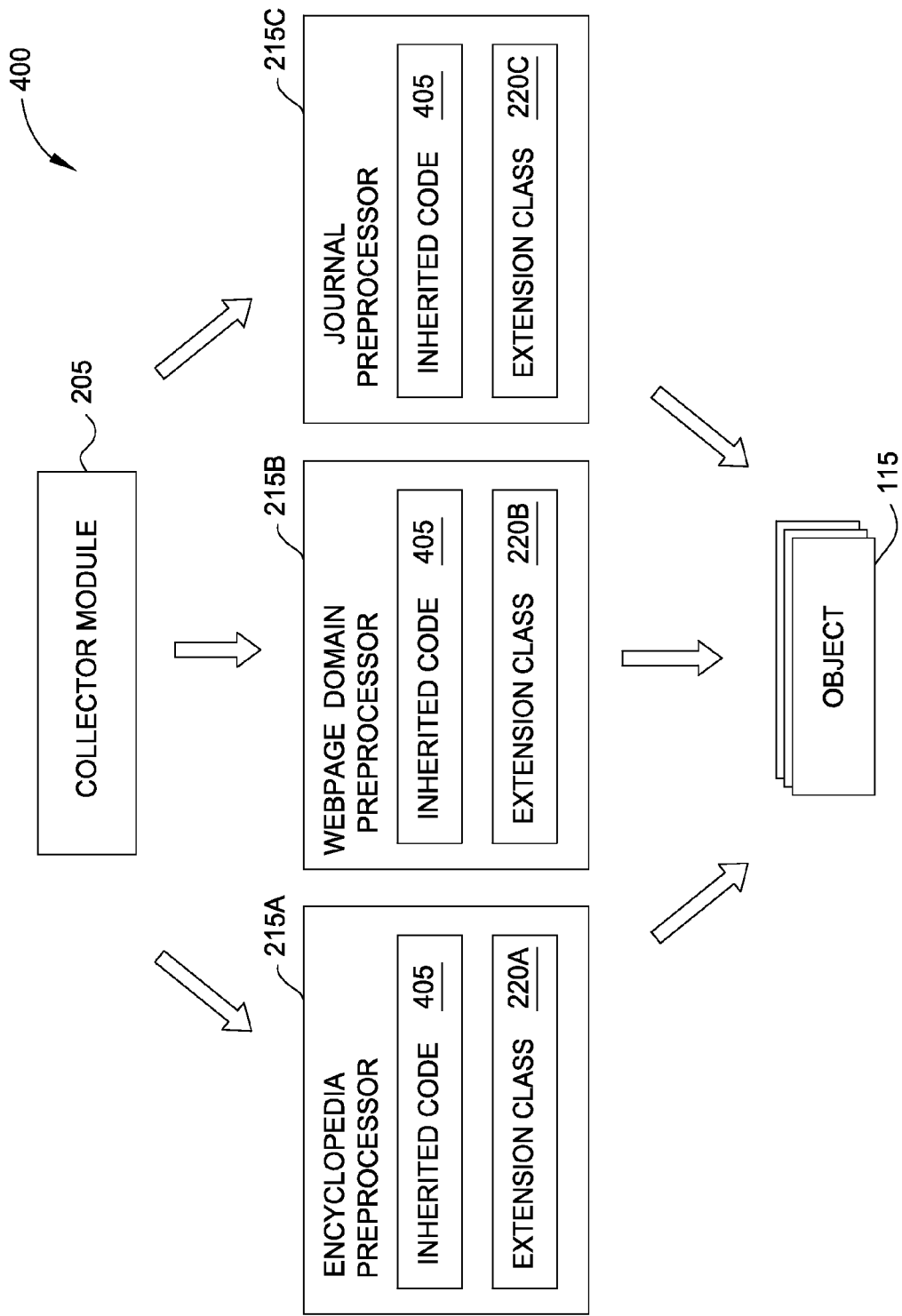
FIG. 4 illustrates various preprocessor types for translating text documents arranged according to multiple formats, according to one embodiment described herein.

FIG. 4 illustrates various preprocessor types for translating text documents arranged according to multiple formats, according to one embodiment described herein. As shown, the flow chart 400 includes multiple instantiations of preprocessor types 215A-215C. For example, if the preprocessing system receives an article from an encyclopedia, the preprocessing unit instantiates the encyclopedia preprocessor 215A. In this manner, each data source may correspond to a particular instantiation of the preprocessor 215. In one embodiment, the preprocessor system includes a different extension class 220 for each different format of text the system receives. For example, although FIG. 4 shows an encyclopedia preprocessor 215, this preprocessor 215A may be for only a specific publisher. That is, a different encyclopedia publisher may use a different format, and thus, have a different associated extension class and use a different preprocessor instantiation. Similarly, the preprocessor 215 may include respective extension classes for different internet domains and different journals. However, if two data sources use the same format, then the preprocessor 215 may include only one extension class for processing text documents received from both of the data sources. For example, if the same publisher issues two different journals but uses the same format for articles in both journals, the same extension class or preprocessor instantiation may be used for text documents from both journals. However, it may be advantageous in certain situations to nonetheless use different extension classes even if the format is the same, especially if the subject matter of the two data sources is different.

Each preprocessor instantiation 215A-215C includes an inherited code portion 405 and an individual extension class portion 220A-220C. The inherited code 405 represents shared or common functionality between the different instantiations 215A-C. In one embodiment, each preprocessor instantiation 215A-C populates the objects 115 using the characterized text. As discussed in FIG. 3, the preprocessors 215 label different sections in the received documents in different context such as discussion, synopsis, generic, text, etc. Once these sections are characterized by the assigned labels, each preprocessor instantiation 215A-C generates an object 115 using the labels and the normalized format. Since generating the object 115 based on the assigned labels may be common to each instantiation regardless of the original format of the text document, the inherited code 405 may include this function.

In contrast to the inherited code 405, the respective extension classes 220A-C may differ based on the original format of the received text documents. For example, the extension classes 220A-C may include the specific code required to parse the different formats and characterize the text portions in the received documents. In one embodiment, the preprocessors 215 first use the extension class code 220A-C and the information in the properties file to parse and label the different textual portions. The preprocessors 215 may then use the inherited code 405 to generate the object 115.

For each received text document, the preprocessing system instantiates a particular preprocessor type 215A-C. As mentioned previously, the collector module 205 may use a characteristic of the text document (e.g., a port the document was received on, the data source type, user designation, and the like) to identify the corresponding properties file 210. The preprocessing system then instantiates the preprocessor 215 to the particular type designated by the extension class in the selected properties file 210. The particular preprocessor instantiation 215 parses the text document, identifies the formatting elements listed in the properties file 210, and assigns the text associated with these formatting elements to the context specified in the properties file 210. The context is then used to associate the text with a particular label in the normalized format used by all the objects 115.

If the user desires to input text documents with a new format into the preprocessing system, the user generates a new properties file 210 and corresponding extension class 220. In this manner, the preprocessing system can be extended to accommodate any new data source. Moreover, once the new properties file 210 and extension class 220 are generated, the received text documents may, in one embodiment, be handled programmatically without further input from the user.

Returning to FIG. 2, preprocessing system 110 uses the preprocessor 215 with a particular extension class 220 to generate the object 115 corresponding to the text document. In one embodiment, the object 115 is a CAS of a natural language processing system. Further still, the CAS may be associated with a particular topic. As the preprocessing system 110 identifies a text document that pertains to a specific topic, the preprocessor 215 inserts the text of the document into the object 115 assigned that topic. If the topic of the text document has not yet been assigned to an object 115, the preprocessor 215 may generate a new object 115. Thus, as the preprocessor 215 translates additional text documents into the normalized format, the objects 115 may be expanded to include more information about the particular topics.

Figure 5:
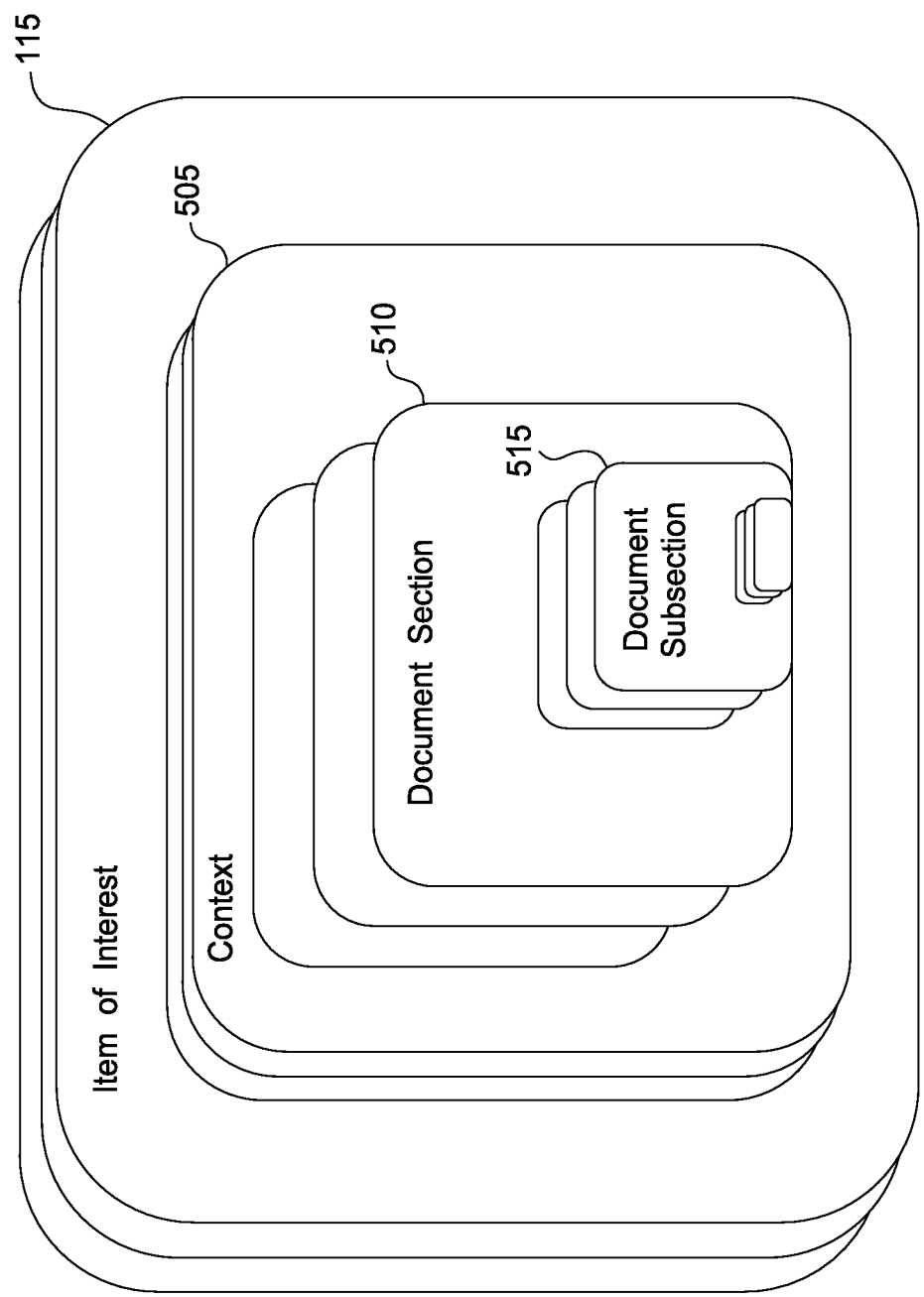
FIG. 5 is a model of the commonly formatted object in the data store, according to one embodiment described herein.

FIG. 5 is a model of the commonly formatted objects, according to one embodiment described herein. As shown, each object 115 is assigned an item of interest. The item of interest may be a specific topic discussed in the text documents ingested by the preprocessing system. In one embodiment, the preprocessor may parse the text document to identify the main topic of the text document which is referred to herein as the "item of interest". Alternatively, the properties file may specify a particular location or formatting element in the document (e.g., the introductory section or the title of the article) that will contain the item of interest. Moreover, the item of interest of a document may be indentified based on the data source from which the text document was received. For example, if the article is retrieved from a journal that deals exclusive with colon cancer, the preprocessing system may use this knowledge to identify the item of interest.

The object 115 may be divided into a plurality of different contexts 505 which stores the different sections of the text document. Once the preprocessor classifies the text in the document as a particular context, the actual text portions of the retrieved document are stored in the document sections 510 and sub-document sections 515. Using the properties file shown in FIG. 3 as an example, the item of interest is Colon Cancer Research. Moreover, the "discussion/general" section of the received document is associated with the discussion context while the "commentary" section is associated with the generic context. The preprocessor may store the actual text of the "discussion/general" section in the discussion context 505 while the text of the "commentary" section is stored in the generic context 505.

In one embodiment, for each new document ingested by the preprocessor that pertains to Colon Cancer Research, the text portions may be stored in the same context 505 but in different document sections 510. Moreover, the document sections 510 may include any number of document sub-sections 515 that further divide the text based on, for example, the formatting elements identified in the document. That is, the "discussion/general" section may be divided into "analysis" and "experimental setup" sub-sections which could then be stored in individual document sub-sections 515. These sections may be further divided as desired.

Returning to FIG. 2, the preprocessing system 110 continues to ingest received documents by identifying the relevant text portions and storing these portions into the appropriate object 115. Thus, each object 115 may include text from a plurality of text documents. Once the all the received documents have been ingested, the preprocessing process is complete. In one embodiment, the resulting objects 115 are sent to the natural language processing pipeline 225. The pipeline 225 may include one or more annotators that parse the objects 115 and generates metadata about the stored data. Because the text of the documents have already been parsed and characterized into the normalized format, the annotators can evaluate the stored text as if the text came from the same data source instead of a plurality of data sources with varying formats. Thus, the annotators may be configured to parse the objects 115 based on the normalized format. For example, an annotator may be tasked with looking only for particular phrase in a document section under a treatment context in an object 115 where the item of interest is a type of cancer. Accordingly, the annotator scans the items of interests and selects only the objects 115 related to cancer (e.g., where cancer is a word in the item of interest) and goes directly to the treatment context stored in the identified objects 115. The annotator then searches the associated document sections or sub-sections for the particular phrase. Because of the text is arranged in the manner shown in FIG. 5, the annotator can parse the text without regards to various original formats used to arrange the text.

In one embodiment, each time the preprocessing system 110 receives new text documents, the preprocessor 215 may update the appropriate object or objects 115 to include the new text. The preprocessor 215 may then transmit the updated objects 115 to the natural language processing pipeline 225 where the annotators update the metadata associated with the stored text. The annotated objects 115 may then be stored in the data store 120 where the objects 115 can be accessed by a natural-language processing computer system to answer questions, diagnose diseases, generate financial reports, and the like.

CONCLUSION

The data store for a natural-language computing system may include information that originates from a plurality of different data sources—e.g., journals, websites, magazines, reference books, textbooks, and the like. In one embodiment, the information or text from the data sources are converted into a single, shared format and stored as objects in a data store. In order to ingest the different documents with their respective formats, a preprocessor may convert the text which is arranged using different formats into a normalized format. To perform this conversion, the preprocessor parses the documents to identify formatting elements such as section headers, paragraph headers, elements in a mark-up language (e.g., HTML and XML tags), and the like.

When using text mined from the data sources to generate the objects, a preprocessing system may use a properties file and individual extension classes to convert the text from the original format to the normalized format shared by all the objects in the data store. Specifically, when a new text document is received from a data source, the text may be correlated to a particular properties file which includes instructions specifying how a preprocessor should interpret the received text. For example, the properties file may indicate the particular extension class that should be used or which portions of the text are relevant and which can be ignored. In one embodiment, the properties file identifies a particular formatting element in the original format (e.g., a specific header or tag) as well as an action the preprocessor should perform with the text associated with that element. For example, the properties file may instruct the preprocessor to ignore the text in the document's reference section of the document but store the text in the document's discussion section. The preprocessor parses the text until it discovers the specified headers and performs the associated action. In this manner, the preprocessor uses the formatting elements in the original format as indicators to associate the text with a formatting element in the commonly shared format. Each time a program administrator wishes to ingest text with a different format into the data store, the administrator may generate a new properties file and a corresponding extension class for configuring the preprocessor to parse the text.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
    a computer processor; and
    a memory containing a program that, when executed on the computer processor, performs an operation for processing data, comprising:
        receiving a plurality of electronic documents, wherein each electronic document is arranged according to a different, respective format comprising a plurality of headers;
        identifying a properties file associated with one of the electronic documents, the properties file defining a particular header of the respective format in the one electronic document, an action corresponding to a text portion associated with the particular header, and an extension class;

instantiating a preprocessor for parsing the one electronic document based on the extension class, wherein the preprocessor is configured to parse only electronic documents arranged using the respective format;

parsing the one electronic document to identify the particular header using the preprocessor;

upon identifying the text portion associated with the particular header, performing the action to the text portion by assigning the text portion to a formatting element of a normalized format; and storing the text portion into a natural language processing (NLP) object based on the formatting element of the normalized format, wherein text in the NLP object is arranged based on the normalized format.

2. The system of claim 1, wherein the properties file is one of a plurality of properties files, wherein each properties file is associated with one of the respective formats of the electronic documents.

3. The system of claim 1, wherein the property file includes a plurality of formatting elements of the respective format, the plurality of formatting elements comprises a title and a section in the one electronic document.

4. The system of claim 1, wherein the NLP object comprises text portions retrieved from other ones of the plurality of electronic documents, wherein the text portions are assigned to the formatting element of the normalized format.

5. The system of claim 4, wherein the NLP object is a common analysis system (CAS) data structure.

6. The system of claim 1, further comprising:
annotating the text in the NLP object for use in a natural-language computing system where the natural-language computing system uses the annotated text to communicate with a user.

7. The system of claim 1, wherein instantiating the preprocessor comprises:
selecting a type of preprocessor based on the extension class, wherein each type of preprocessor corresponds to a different data source transmitting the plurality of electronic documents.

8. A computer program product comprising:
a non-transitory computer-readable storage medium having computer-readable program code embodied therewith, the computer-readable program code comprising computer-readable program code configured to:
receive a plurality of electronic documents, wherein each electronic document is arranged according to a different, respective format comprising a plurality of headers;

identify a properties file associated with one of the electronic documents, the properties file defining a particular header of the respective format in the one electronic document, an action corresponding to a text portion associated with the particular header, and an extension class;

instantiate a preprocessor for parsing the one electronic document based on the extension class, wherein the preprocessor is configured to parse only electronic documents arranged using the respective format;

parse the one electronic document to identify the particular header using the preprocessor;

upon identifying the text portion associated with the particular header, perform the action to the text portion by assigning the text portion to a formatting element of a normalized format; and store the text portion into a natural language processing (NLP) object based on the formatting element of the normalized format, wherein text in the NLP object is arranged based on the normalized format.

9. The computer program product of claim 8, wherein the properties file is one of a plurality of properties files, wherein each properties file is associated with one of the respective formats of the electronic documents.

10. The computer program product of claim 8, wherein the property file includes a plurality of formatting elements of the respective format, the plurality of formatting elements comprises a title and a section in the one electronic document.

11. The computer program product of claim 8, wherein the NLP object comprises text portions retrieved from other ones of the plurality of electronic documents, wherein the text portions are assigned to the formatting element of the normalized format, and wherein the NLP object is a common analysis system (CAS) data structure.

12. The computer program product of claim 8, further comprising computer-readable program code configured to:
annotate the text in the NLP object for use in a natural-language computing system where the natural-language computing system uses the annotated text to communicate with a user.

13. The computer program product of claim 8, wherein instantiating the preprocessor comprises computer-readable program code configured to:
select a type of preprocessor based on the extension class, wherein each type of preprocessor corresponds to a different data source transmitting the plurality of electronic documents.

* * * * *